(12) United States Patent
Choi

(10) Patent No.: US 10,921,686 B2
(45) Date of Patent: Feb. 16, 2021

(54) CAMERA MODULE INCLUDING LIQUID LENS

(71) Applicant: LG INNOTEK CO., LTD., Seoul (KR)

(72) Inventor: Yong Bok Choi, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 16/499,658

(22) PCT Filed: Mar. 30, 2018

(86) PCT No.: PCT/KR2018/003754
§ 371 (c)(1),
(2) Date: Sep. 30, 2019

(87) PCT Pub. No.: WO2018/182348
PCT Pub. Date: Oct. 4, 2018

(65) Prior Publication Data
US 2020/0041875 A1 Feb. 6, 2020

(30) Foreign Application Priority Data
Mar. 30, 2017 (KR) .................. 10-2017-0040555

(51) Int. Cl.
*G02B 13/00* (2006.01)
*G03B 17/12* (2021.01)
*G02B 3/12* (2006.01)
*G02B 27/64* (2006.01)
*H04N 5/225* (2006.01)

(52) U.S. Cl.
CPC .............. *G03B 17/12* (2013.01); *G02B 3/12* (2013.01); *G02B 27/64* (2013.01); *H04N 5/2254* (2013.01); *G02B 13/0015* (2013.01); *H04N 5/2257* (2013.01)

(58) Field of Classification Search
None
See application file for complete search history.

(56) References Cited

U.S. PATENT DOCUMENTS

| 2007/0247723 A1 | 10/2007 | Park et al. | |
| 2008/0026626 A1* | 1/2008 | Ma .................. | H01R 12/7076 439/330 |
| 2009/0190919 A1* | 7/2009 | Kuo .................. | G02B 7/023 396/529 |
| 2009/0236873 A1* | 9/2009 | Kroppe ............ | B62D 33/04 296/186.1 |

(Continued)

FOREIGN PATENT DOCUMENTS

| CN | 101685170 A | 3/2010 |
| JP | 2007-293263 A | 11/2007 |

(Continued)

*Primary Examiner* — Mark T Monk
(74) *Attorney, Agent, or Firm* — Birch, Stewart, Kolasch & Birch, LLP

(57) ABSTRACT

Provided is a camera module including a liquid lens including an electrode; a holder for receiving the liquid lens therein; a base disposed under the holder; a sensor board disposed under the base and including an image sensor; a connection board connected to at least a portion of the electrode of the liquid lens; and a terminal plate disposed at the base and electrically connected to the sensor board and the connection board.

20 Claims, 8 Drawing Sheets

(56) References Cited

U.S. PATENT DOCUMENTS

| | | |
|---|---|---|
| 2010/0284091 A1 | 11/2010 | Okamoto |
| 2011/0134303 A1* | 6/2011 | Jung .................... H04N 5/2251 |
| | | 348/340 |
| 2016/0001644 A1* | 1/2016 | Sakurai ................. B60J 5/0431 |
| | | 49/398 |
| 2016/0013134 A1* | 1/2016 | Pratt ................... H01L 23/3157 |
| | | 257/738 |

FOREIGN PATENT DOCUMENTS

| | | |
|---|---|---|
| JP | 2009-166595 A | 8/2009 |
| KR | 10-0847804 B1 | 8/2006 |
| KR | 10-0815327 B1 | 3/2008 |
| KR | 10-2011-0064156 A | 6/2011 |
| WO | WO 2007/058451 A1 | 5/2007 |

* cited by examiner

[FIG. 1]
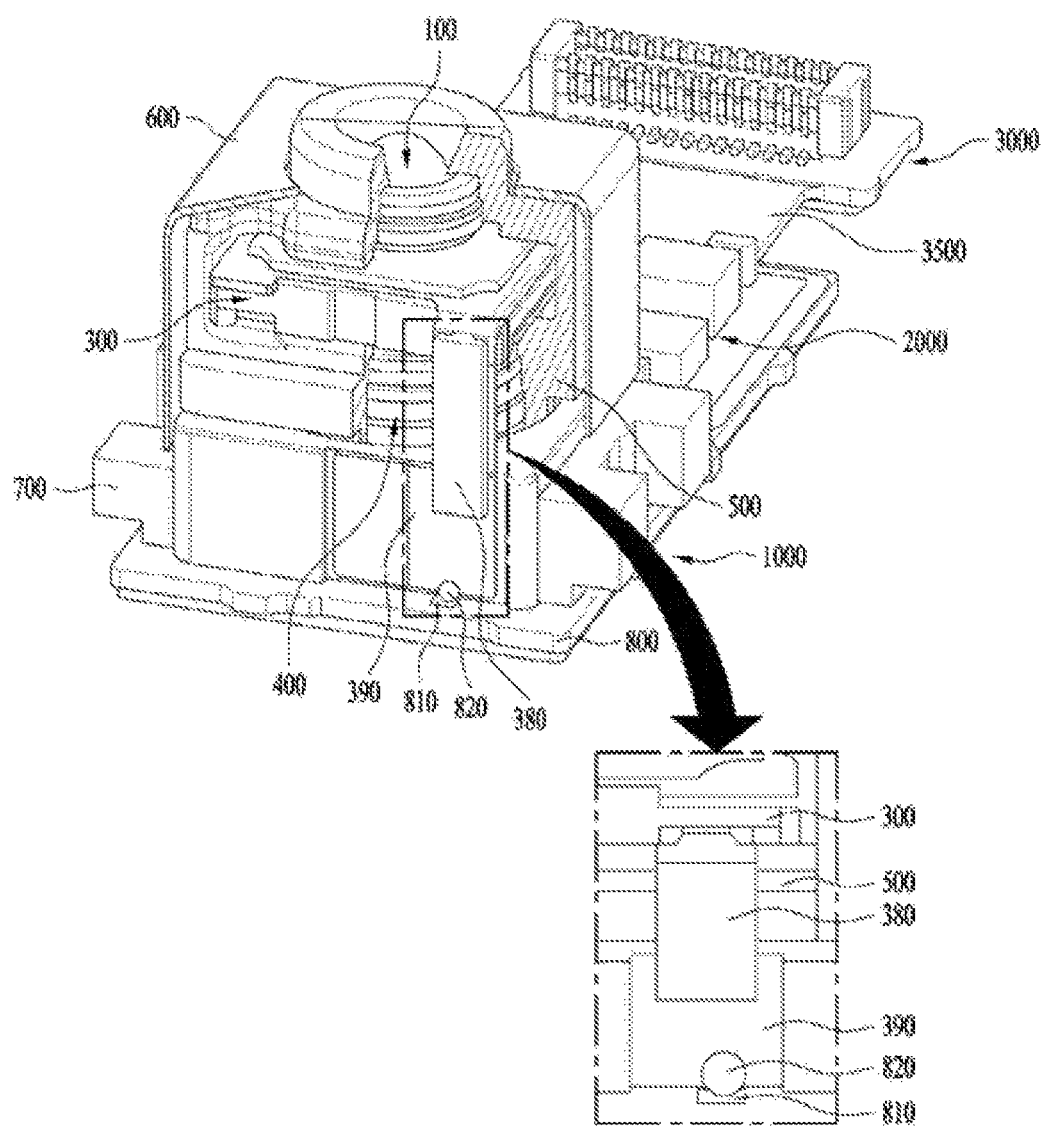

【FIG. 2】
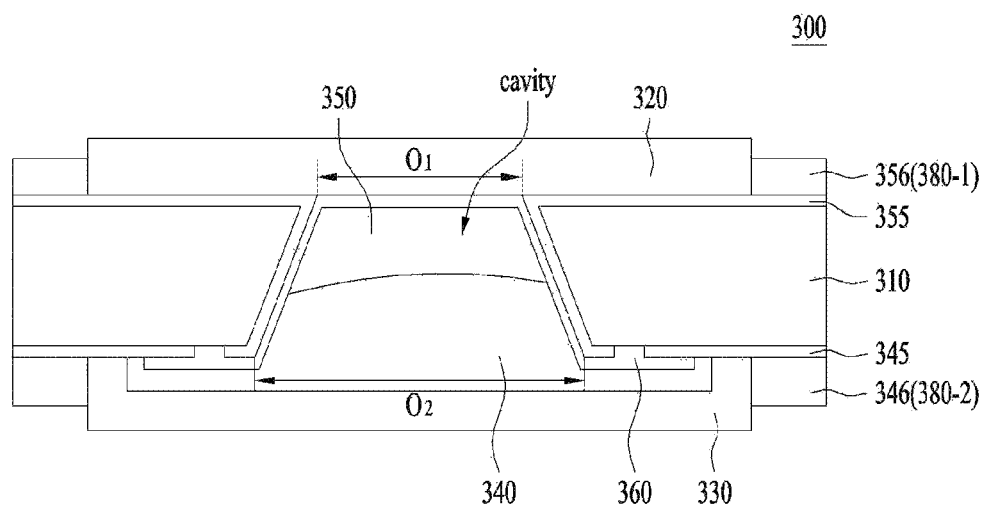
【FIG. 3】
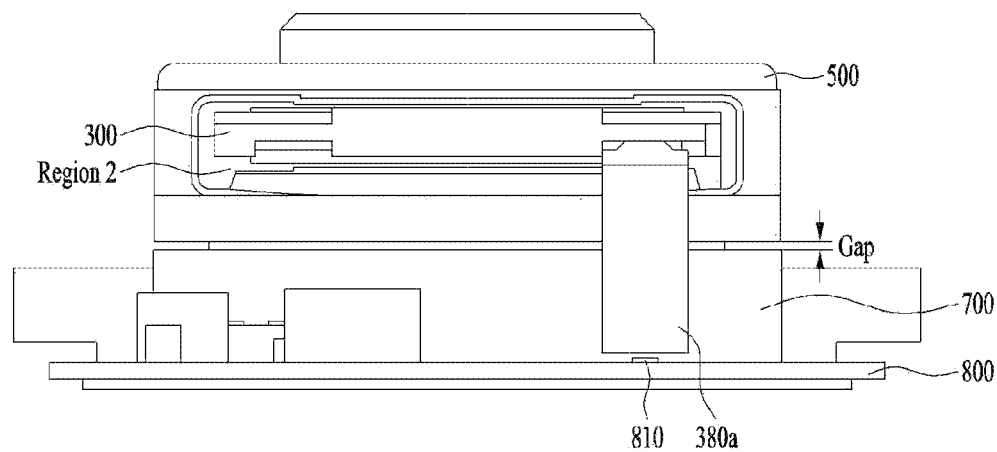

[FIG. 4]
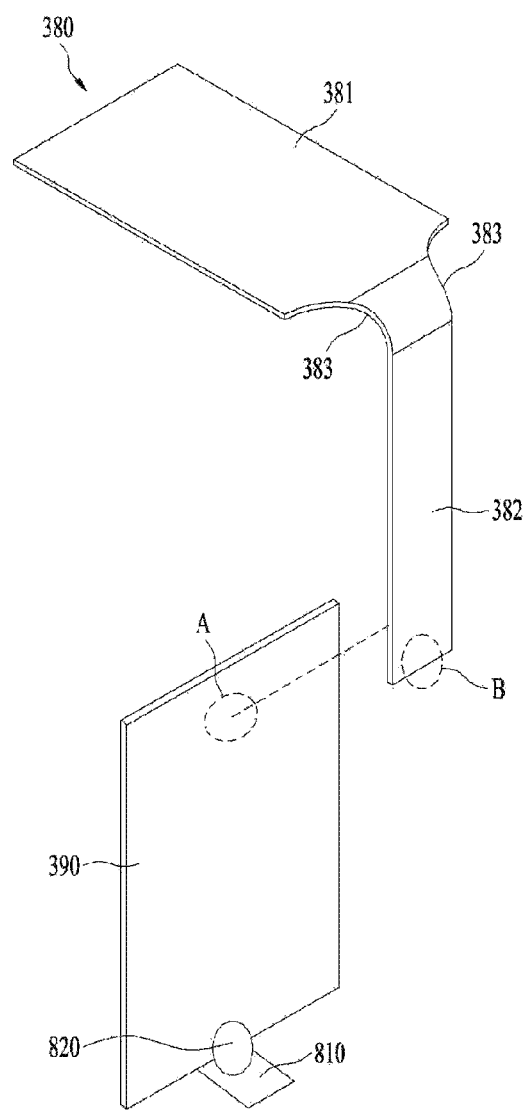

【FIG. 5】
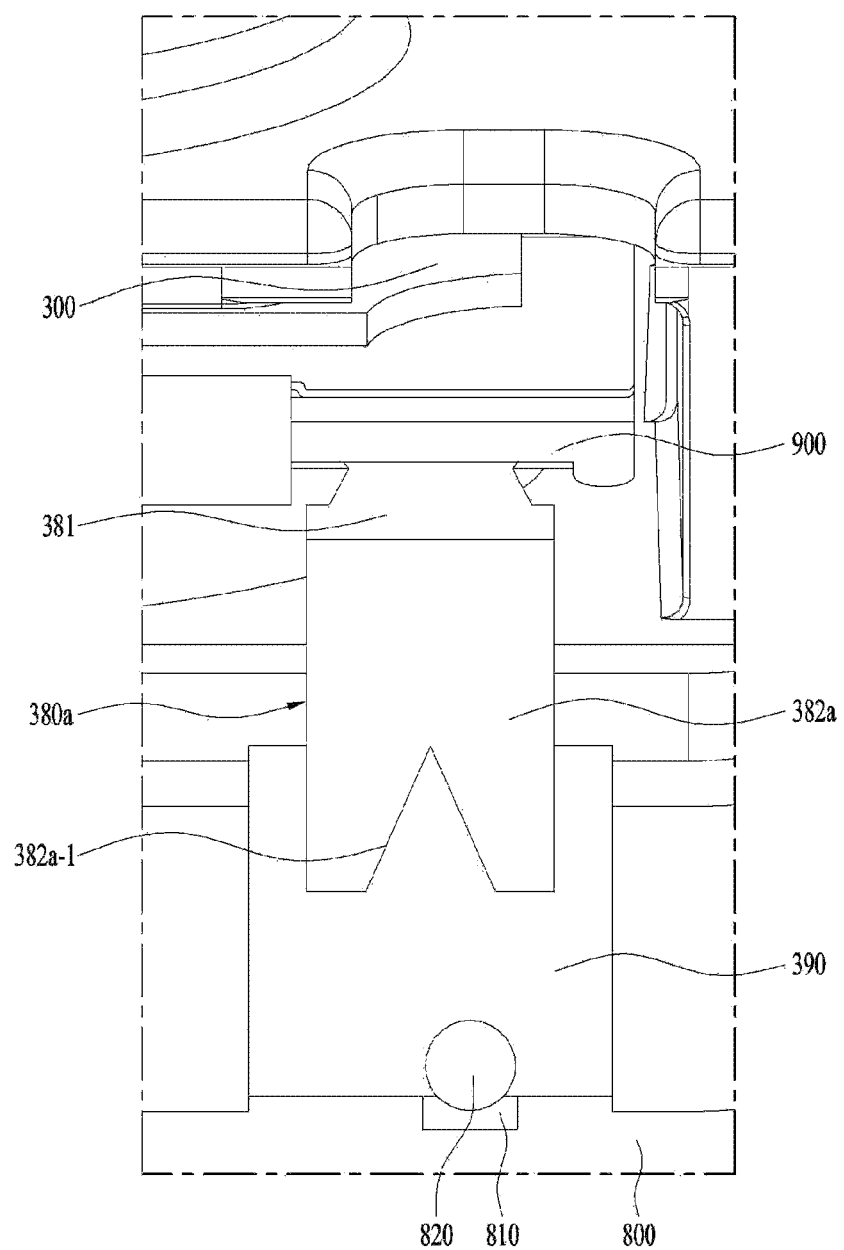

[FIG. 6]
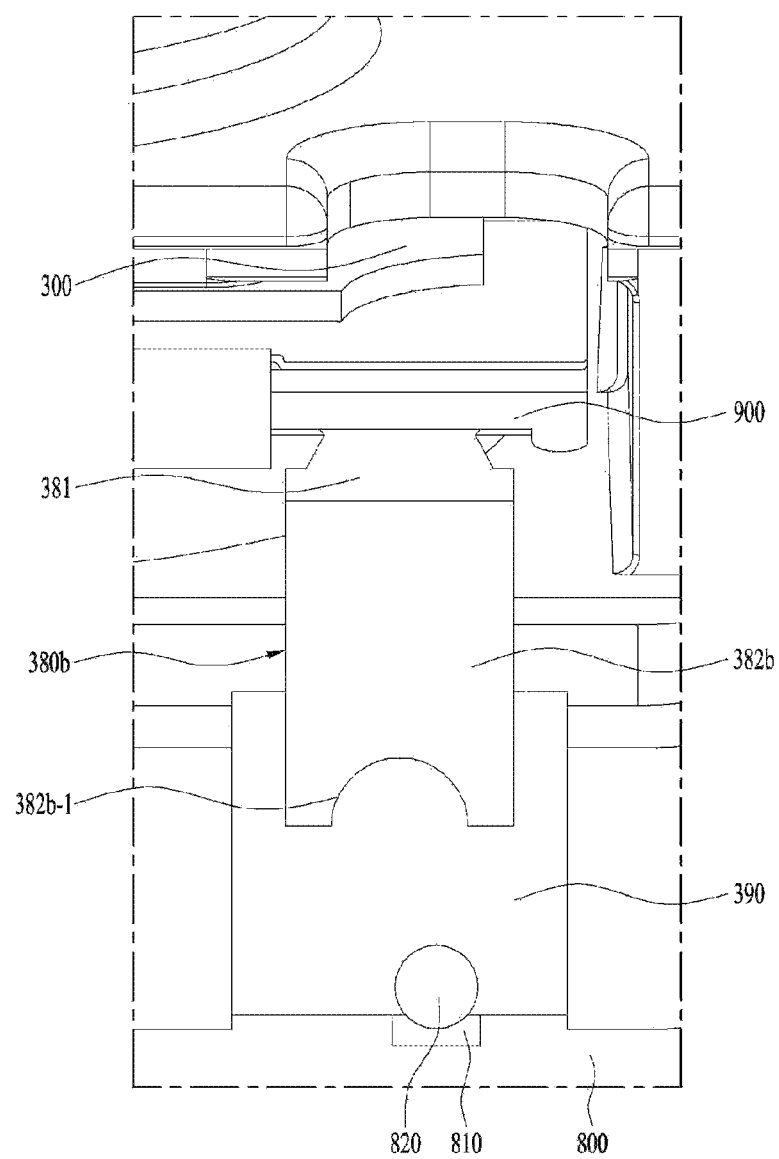

【FIG. 7】
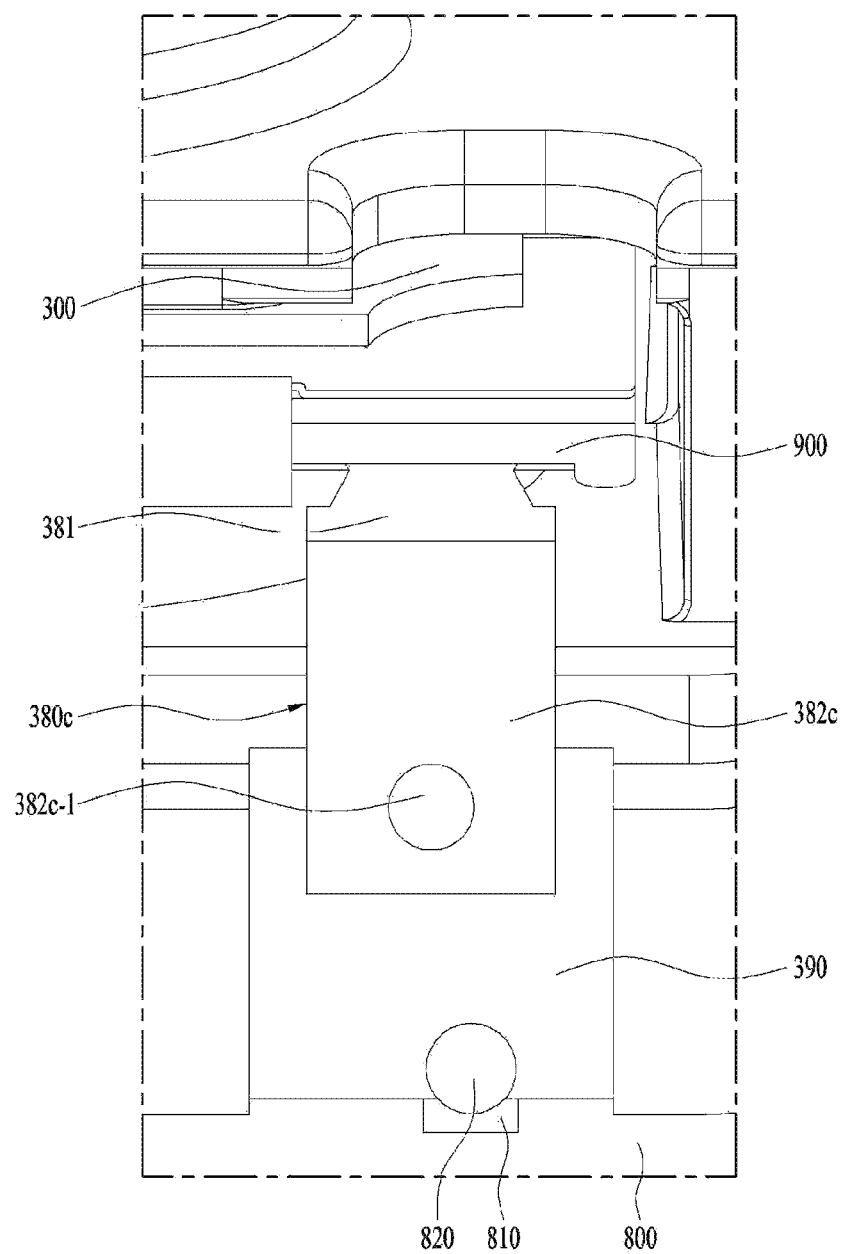

[FIG. 8]
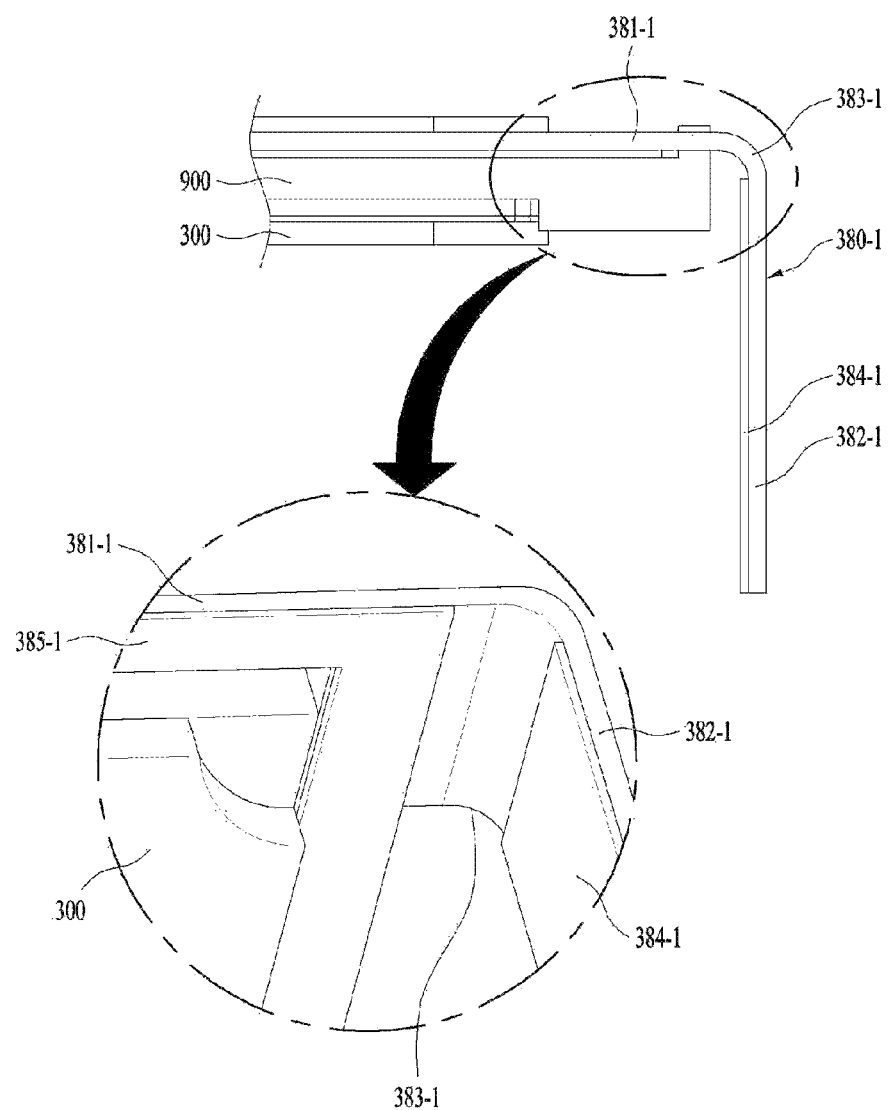

[FIG. 9]
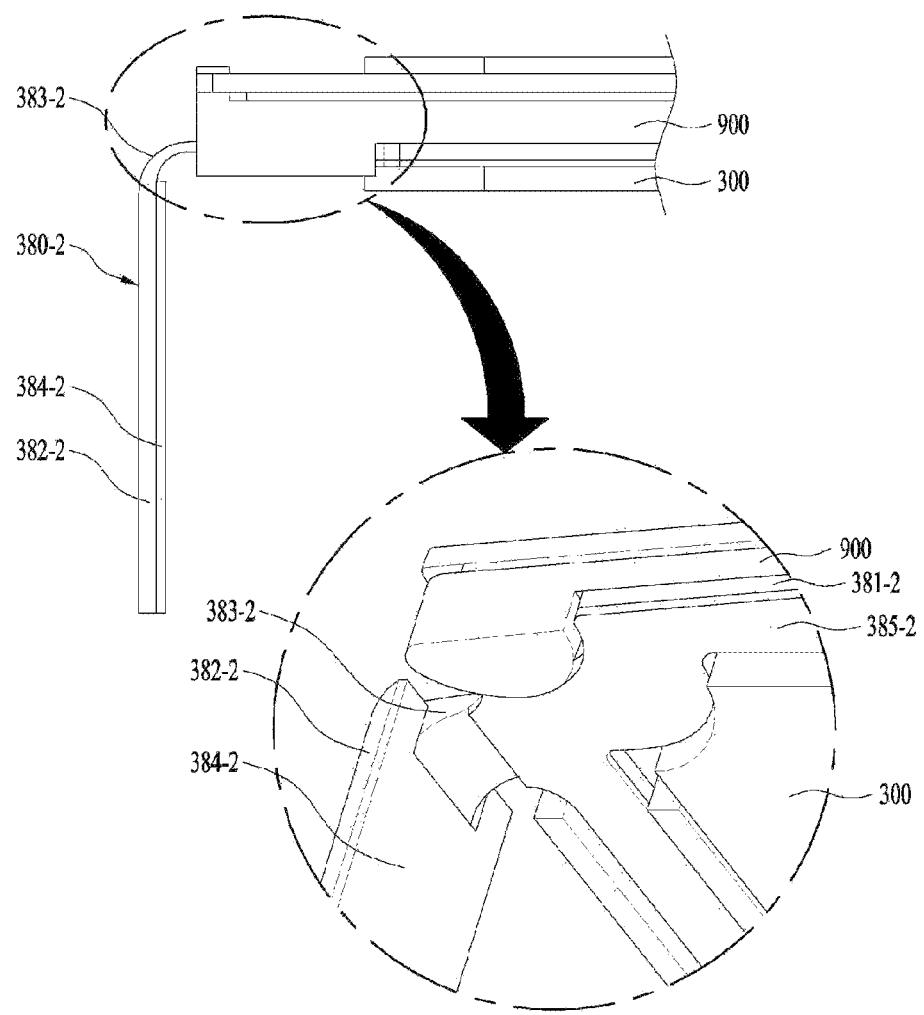

CAMERA MODULE INCLUDING LIQUID LENS

CROSS REFERENCE TO RELATED APPLICATIONS

This application is the National Phase of PCT International Application No. PCT/KR2018/003754, filed on Mar. 30, 2018, which claims priority under 35 U.S.C. 119(a) to Patent Application No. 10-2017-0040555, filed in the Republic of Korea on Mar. 30, 2017, all of which are hereby expressly incorporated by reference into the present application.

TECHNICAL FIELD

Embodiments relate to a camera module, and more particularly to a camera module including a liquid lens and an optical device including the same.

BACKGROUND ART

People who use portable devices demand optical devices that have high resolution, are small, and have various photographing functions (an autofocus (AF) function, a hand-tremor compensation or optical image stabilization (OIS) function, etc.). Such photographing functions may be realized by directly moving a plurality of lenses that are combined. In the case in which the number of lenses is increased, however, the size of an optical device may be increased.

The autofocus and hand-tremor compensation functions are performed by tilting or moving a lens module including a plurality of lenses, which are fixed to a lens holder in the state in which the optical axes of the lenses are aligned, along the optical axis or in a direction perpendicular to the optical axis. An additional lens-moving apparatus is used to move the lens module. However, the lens-moving apparatus consumes a lot of power, requires driving members, such as magnets and coils, to move the lens module, and requires extra space corresponding to the moving range of the lens module in order to move the lens module, thus leading to an increase in the overall thickness of a camera module and an optical device.

Therefore, research has been conducted on a liquid lens configured to electrically adjust the curvature of an interface between two kinds of liquid in order to perform autofocus and hand-tremor compensation functions.

DISCLOSURE

Technical Problem

Embodiments provide a camera module including a liquid lens and an optical device, in which electrical bonding between a liquid lens and a sensor board is conveniently realized without being influenced by a manufacturing tolerance of a connection board or the gap between a holder and a base.

Embodiments provide a camera module including a liquid lens and an optical device, in which a connection board is easily bent and conveniently bonded to another element, and is prevented from being damaged by stress.

Embodiments provide a camera module including a liquid lens and an optical device, in which a connection board, connected to an electrode, is prevented from lifting upwards or downwards.

Technical Solution

In one embodiment, a camera module may include a liquid lens including an electrode, a holder accommodating the liquid lens therein, a base disposed under the holder, a sensor board disposed under the base, the sensor board including an image sensor, a connection board connected to at least a portion of the electrode of the liquid lens, and a terminal plate disposed at the base, the terminal plate being electrically connected to the sensor board and the connection board.

The liquid lens may include a first plate including a cavity formed therein to accommodate a first liquid, which is conductive, and a second liquid, which is non-conductive, therein, a second plate disposed on the first plate, and a third plate disposed under the first plate. The electrode may include a first electrode disposed on the first plate, and a second electrode disposed under the first plate.

The connection board may be disposed so as to be electrically connected to the first electrode or the second electrode of the liquid lens. One side of the terminal plate may be coupled to a lower portion of the connection board, and the opposite side of the terminal plate may be coupled to the sensor board.

The connection board may include a horizontal plate disposed at a position corresponding to the first electrode or the second electrode, a vertical plate coupled to the terminal plate, the vertical plate being disposed at a position corresponding to a side surface of the liquid lens, and a connection plate disposed between the horizontal plate and the vertical plate.

The connection plate may include a bent region and may connect the horizontal plate and the vertical plate to each other, and the connection board may further include a concave portion recessed in the bent region.

The width of the connection plate may gradually decrease from the horizontal plate to the vertical plate.

The concave portion may be disposed at each of opposite sides of the bent region.

The vertical plate may have a width smaller than the width of the terminal plate, and may have a vertical length to cover at least a portion of an upper region of the terminal plate.

In another embodiment, a camera module may include a liquid lens including an electrode, a holder accommodating the liquid lens therein, a sensor board disposed under the holder, the sensor board including an image sensor and a terminal, and a connection board connected to the electrode of the liquid lens, the connection board being bent downwards so as to be electrically connected to the terminal of the sensor board, the connection board including a horizontal plate disposed at a position corresponding to the electrode of the liquid lens, a vertical plate disposed at a position corresponding to a side surface of the liquid lens, a connection plate bent between the horizontal plate and the vertical plate, and a reinforcing pad disposed on at least one of the horizontal plate or the vertical plate, the reinforcing pad having stiffness greater than the stiffness of the connection plate.

The reinforcing pad may be coupled to a lower portion of the horizontal plate or to an inner side of the vertical plate.

Advantageous Effects

In a camera module including a liquid lens and an optical device according to embodiments, since a connection board and a terminal plate are electrically coupled to each other, the electrical connection between a liquid lens and a sensor board may be more conveniently realized without being influenced by a manufacturing tolerance of the connection board or the coupling gap between a holder and a base.

In addition, the connection board may include a concave portion, so that the connection board may be more easily bent and conveniently bonded to the terminal plate, and may be prevented from being damaged by stress.

In addition, the connection board may include a lifting prevention portion, so that the connection board, connected to an electrode, may be prevented from lifting upwards or downwards.

DESCRIPTION OF DRAWINGS

FIG. 1 is a view showing a first example of a camera module,

FIG. 2 is a view showing the cross-section of a liquid lens of the camera module shown in FIG. 1, FIG. 3 is a view showing one example of electrically bonding a terminal to a connection board in the camera module, FIG. 4 is an exploded perspective view showing the process of coupling the connection board to a terminal plate shown in FIG. 1, FIGS. 5 to 7 are front views showing the coupled state of the connection board and the terminal plate according to a second example, a third example, and a fourth example of the camera module, and FIGS. 8 and 9 are views showing examples of the connection board including a lifting prevention portion.

BEST MODE

Hereinafter, embodiments for accomplishing the aforementioned objects will be described with reference to the accompanying drawings.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

FIG. 1 is a view of one example of a camera module. The camera module may include a lens assembly 1000 and a control circuit 2000.

The lens assembly 1000 may include a liquid lens and/or a solid lens. The liquid lens may include a liquid, a plate, and an electrode. The liquid may include a conductive liquid and a non-conductive liquid, and the electrode may be disposed on or under the plate. In addition, the electrode may include a common terminal and a plurality of individual terminals. The common terminal may be single in number, and the individual terminal may be plural in number. The plate may include a first plate, which includes a cavity in which the liquid is disposed, and may further include a second plate, which is disposed on or under the first plate. In addition, the liquid lens may further include a third plate, and the first plate may be disposed between the second plate and the third plate. The shape of the interface formed between the conductive liquid and the non-conductive liquid may be changed in response to the driving voltage applied between the common terminal and each of the individual terminals, and accordingly the focal length may be changed. The control circuit 2000 may supply a driving voltage to the liquid lens, and may be disposed on a sensor board 800 on which an image sensor is disposed. The camera module may further include a connector 3000. The connector 3000 may be connected to the control circuit 2000 via a connection part 3500, and may electrically connect the control circuit 2000 to an external power source or other devices.

The configuration of the control circuit 2000 may be designed differently in accordance with the specifications required for a photography device. In particular, in order to reduce the intensity of the operating voltage to be applied to the lens assembly 1000, the control circuit 2000 may be implemented as a single chip. As a result, it is possible to further reduce the size of the camera module that is mounted in a portable device.

The lens assembly 1000 may include a first lens unit 100, a second lens unit 400, a liquid lens 300, a holder 500, and a cover 600. Any one of the first lens unit 100 and the second lens unit 400 may be omitted.

The illustrated structure of the lens assembly 1000 is just one example, and the structure of the lens assembly 1000 may be changed depending on the specifications required for the camera module.

The first lens unit 100 may be disposed at the front side of the lens assembly 1000, and may receive light incident thereon from the outside of the lens assembly 1000. The first lens unit 100 may be constituted by at least one lens, or two or more lenses may be aligned along a center axis to form an optical system. Here, the center axis may be the same as the optical axis of the optical system.

The first lens unit 100 may be constituted by two lenses. However, the disclosure is not limited thereto.

An exposure lens (not shown) may be provided on the front surface of the first lens unit 100, and a cover glass may be disposed in front of the exposure lens. The exposure lens may protrude so as to be exposed to the outside of the holder 500, and thus the surface thereof may be damaged. If the surface of the lens is damaged, the quality of the image captured by the camera module may be deteriorated. In order to prevent or minimize damage to the surface of the exposure lens, a method of disposing a cover glass, a method of forming a coating layer, or a method of forming the exposure lens using a wear-resistant material for preventing damage to the surface of the exposure lens may be applied.

The second lens unit 400 may be disposed at the rear of the first lens unit 100 and the liquid lens 300, and the light incident on the first lens unit 100 from the outside may pass through the liquid lens 300 and may be incident on the second lens unit 400. The second lens unit 400 may be spaced apart from the first lens unit 100 and may be disposed in a through-hole formed in the holder 500. The second lens unit 400 may be constituted by at least one lens, and when two or more lenses are included, the lenses may be aligned along the center axis to form an optical system.

In order to distinguish the above-described first and second lens units 100 and 400 from the liquid lens 300, the first and second lens units 100 and 400 may be referred to as first and second solid lens units, respectively.

The liquid lens 300 may be disposed under the first lens unit 100, and the second lens unit 400 may be disposed under the liquid lens 300. That is, the liquid lens 300 may be disposed between the first lens unit 100 and the second lens unit 400.

FIG. 2 is a view showing the cross-section of the liquid lens of the camera module shown in FIG. 1.

Specifically, the liquid lens 300 may include a first plate 310, in which a cavity is formed to accommodate a first liquid 350, which is non-conductive, and a second liquid 340, which is conductive, therein, a first electrode 355 disposed on the first plate 310, a second electrode 345 disposed under the first plate, a second plate 320 disposed on the first electrode 355, and a third plate 330 disposed under the second electrode 345.

The first plate 310 may be disposed between the second plate 320 and the third plate 330, and may include upper and lower openings having a predetermined inclined surface (e.g. an inclined surface having an angle of about 50 to 70 degrees, specifically an angle of 55 to 65 degrees). The region surrounded by the aforementioned inclined surface, the opening contacting the second plate 320, and the opening contacting the third plate 330 may be referred to as a 'cavity'.

The first plate 310 is a structure that accommodates the first and second liquids 350 and 340 therein. Each of the second plate 320 and the third plate 330 may include a region through which light passes, and thus may be made of a light-transmissive material such as, for example, glass. The second plate 320 and the third plate 330 may be made of the same material for convenience of processing.

In addition, the first plate 310 may include impurities so that light does not easily pass therethrough.

The second plate 320 is a structure through which light incident thereon from the first lens unit 100 travels to the interior of the cavity, and the third plate 330 is a structure through which the light that has passed through the cavity travels to the second lens unit 400.

The aforementioned cavity may be filled with the first liquid 350 and the second liquid 340, which have different properties from each other, and an interface may be formed between the first liquid 350 and the second liquid 340. The curvature and the inclination of the interface formed between the first liquid 350 and the second liquid 340 may be changed.

That is, a configuration in which the surface tension of the first and second liquids 350 and 340 is changed using electrical energy may reduce the size of a camera module compared to a configuration in which a focal length is adjusted by moving solid lenses (adjusting the distance between the lenses), and may consume a small amount of power compared to a configuration in which lenses are mechanically moved using a motor or the like.

The first liquid 350 may be oil, e.g. phenyl-based silicon oil.

The second liquid 340 may be made of, for example, a mixture of ethylene glycol and sodium bromide (NaBr).

Each of the first liquid 350 and the second liquid 340 may include at least one of a sterilizing agent or an antioxidant. The antioxidant may be a phenol-based antioxidant or a phosphorus (P)-based antioxidant. The sterilizing agent may be any one of an alcohol-based sterilizing agent, an aldehyde-based sterilizing agent, and a phenol-based sterilizing agent.

The first electrode 355 may be spaced apart from the second electrode 345, and may be disposed on the upper surface, the side surface, and a portion of the lower surface of the first plate 310. The second electrode 345 may be disposed on a portion of the lower surface of the first plate 310, and may be in direct contact with the second liquid 340.

The side surface of the first plate 310 or the side surface of an insulation layer 360 may form the inclined surface or the side wall of the cavity. The first electrode 355 may be in contact with the first liquid 350 and the second liquid 340, with the insulation layer 360 interposed therebetween, which will be described later. The second electrode 345 may be in direct contact with the second liquid 340.

An electrical signal received from an external sensor board 800 may be applied to the first electrode 355 and the second electrode 345 in order to control the interface between the first liquid 350 and the second liquid 340.

The first electrode 355 and the second electrode 345 may be made of a conductive material, e.g. metal, and specifically may include chrome (Cr). Chromium or chrome is a glossy silver rigid transition metal, which is not fragile, does not readily discolor, and has a high melting point.

Further, since an alloy including chromium exhibits high corrosion resistance and rigidity, chromium may be used in the state of being alloyed with other metals. In particular, since chrome (Cr) is not easily corroded or discolored, chrome exhibits high resistance to the conductive liquid in the cavity.

The insulation layer 360 may be disposed so as to cover the lower surface of the second plate 330 on the upper surface of the cavity, the first electrode 355 forming the side wall of the cavity, the first electrode 355 on the lower surface of the first plate 310, the first plate 310 on the lower surface of the first plate 310, and a portion of the second electrode 345 on the lower surface of the first plate 310. The insulation layer 360 may be implemented as, for example, a parylene C coating agent, and may further include a white dye. The white dye may increase the degree to which light is reflected by the insulation layer 360 forming the side wall i of the cavity.

As illustrated, the first liquid 350 may be in surface contact with the second plate 320, with the insulation layer 360 interposed therebetween, and the second liquid 340 may be in direct surface contact with the third plate 330.

The cavity may include a first opening that is oriented toward the second plate 320 and a second opening that is oriented toward the third plate 330. The cross-sectional size O1 of the first opening may be smaller than the cross-sectional size O2 of the second opening, or vice versa. Here, when each of the first and second openings has a circular cross-section, the size of the openings may refer to a diameter thereof, and when each of the openings has a square cross-section, the size of the openings may refer to a diagonal length thereof.

Each of the second plate 320 and the third plate 330 may have rectangular edges. However, the disclosure is not limited thereto.

The first electrode 355 may be exposed from at least one region of the edges of the second plate 320, and the second electrode 345 may be exposed from at least one region of the edges of the third plate 330.

In addition, a first connection electrode 356 may be disposed on the first electrode 355 in the outer region of the second plate 320, and a second connection electrode 346 may be disposed on the second electrode 345 in the outer region of the third plate 330.

Although not illustrated, a conductive epoxy may be disposed between the first electrode 355 and the first connection electrode 356, and may also be disposed between the second electrode 345 and the second connection electrode 346.

The first connection electrode 356 may be integrally formed with the first electrode 355, and the second connection electrode 346 may be integrally formed with the second electrode 345.

The first connection electrode 356 and the second connection electrode 346 may be connected to a terminal plate 390 via a connection board 380, and may be electrically connected to a terminal 810 of a flexible sensor board 800.

The liquid lens 300 described above may be coupled to a spacer 900 shown in FIGS. 5 to 9, and thus may be easily mounted in and removed from the holder 500 in a modular form. The spacer 900 may have a polygonal planar structure surrounding the liquid lens 300, and the polygonal shape may be, for example, a quadrangular shape. In addition, the spacer 900 may have a closed curve structure having an open center region and a quadrangular periphery. The liquid lens 300 coupled to the spacer 900 may be stably mounted in the holder 500.

As shown in FIG. 1, the holder 500 may include an open upper portion, an open lower portion, and a through-hole formed therein. The first lens unit 200, the second lens unit 400, and the liquid lens 300 may be disposed in the through-hole formed in the holder 500. In detail, the first lens unit 100 may be disposed in the upper portion of the holder 500 and may be coupled thereto, and the second lens unit 400 may be disposed in the lower portion of the holder 500 and may be coupled thereto.

The liquid lens 300, the first lens unit 100 disposed on the liquid lens, and the second lens unit 400 disposed under the liquid lens may be disposed in the holder 500 so as to be fixed thereto. The liquid lens 300 may be aligned along the center axis in the same manner as the first lens unit 100 and the second lens unit 400.

The cover 600 may be disposed so as to surround the first lens unit 100, the second lens unit 400, the liquid lens 300, and the holder 500. The cover 600 and the holder 500 may be disposed on a base 700. The base 700 may be integrally formed with the holder 500. The holder 500 may act as the base 700 as needed. In this case, the base 700 may be omitted.

The sensor board 800 may be disposed under the base 700, and may include an image sensor (not shown) and a terminal 810. A light-receiving element of the image sensor may be provided in the sensor board 800. The width and/or the length of a unit pixel of the image sensor may be, for example, 2 µm (micrometers) or less.

The terminal 810 may supply current to the first and second electrodes 355 and 345 (refer to FIG. 2) of the liquid lens 300 using the connection board. This will be described below in more detail with reference to the drawings.

FIG. 3 is a view showing one example of electrically bonding the terminal to the connection board in the camera module.

As shown in FIG. 3, first to third regions (region 1 to region 3) may be provided inside the holder 500. The first lens unit 100 may be inserted into the first region (region 1), the liquid lens 300 may be disposed in the second region (region 2), and the second lens unit 400 may be disposed in the third region (region 3). Here, the first region (region 1) may be located on the second region (region 2), and the third region (region 3) may be located under the second region (region 2). The aforementioned through-hole formed in the holder 500 may include the first to third regions (region 1 to region 3).

The second region (region 2) may include an opening, which is formed in the side surface of the holder 500 so as to be used as an entrance through which the liquid lens 300 is inserted into the holder. Thus, the liquid lens 300 may be inserted into the holder 500 through the side opening formed in the holder 500, and may be accommodated in the second region (region 2) of the holder 500.

The liquid lens 300 accommodated in the holder 500 may be electrically connected to the terminals 810 of the sensor board 800 using the connection board 380a, which is exposed to the outside of the holder 500. Here, the connection board 380a may be, for example, a flexible printed circuit board.

The connection board 380a may include an upper terminal unit including a plurality of terminals and a lower terminal unit including a plurality of terminals. The upper terminal unit may be coupled to the first and second connection electrodes 356 and 346 of the liquid lens 300, and thus may be connected to the first electrode 355 or the second electrode 345. Although it is illustrated in FIG. 3 that the upper terminal unit of the connection board 380a is connected to the second electrode 345 of the liquid lens 300, the upper terminal unit of the connection board 380a may be connected to the first electrode 355. Alternatively, the upper terminal unit of the connection board 380a may be integrated with first and second connection electrodes 380-1 and 380-2 so as to be connected to the first electrode 355 or the second electrode 345 of the liquid lens 300.

Meanwhile, the connection board 380a is formed so as to be bent from the horizontal direction of the liquid lens 300 to the vertical direction thereof such that the lower terminal unit is bonded to the terminal 810 of the sensor board 800.

However, if a manufacturing tolerance of the connection board 380a occurs, for example, when the length of the connection board 380a becomes shorter or longer than a reference value, it may be difficult to realize bonding to the terminal 810 of the sensor board 800.

In addition, if an error occurs in the gap in the process of coupling the holder 500, in which the liquid lens 300 is accommodated, to the base 700, it may also be difficult to realize bonding between the connection board 380a and the terminal 810 of the sensor board 800.

Therefore, it is required to more conveniently realize the electrical connection between the liquid lens 300 and the sensor board 800 without being influenced by a manufacturing tolerance of the connection board 380a or the coupling gap between the holder 500 and the base 700.

FIG. 4 is an exploded perspective view showing the process of coupling the connection board to the terminal plate shown in FIG. 1.

Unlike the above-described configuration, the embodiment may be configured such that the connection board 380 and the terminal plate 390 are provided separately from each other.

The connection board 380 may be disposed so as to be connected to the first electrode 355 or the second electrode 345 of the liquid lens 300. The connection board 380 may be, for example, a flexible printed circuit board.

The connection board 380 may include an upper terminal unit including a plurality of terminals and a lower terminal unit including a plurality of terminals. The upper terminal unit may be coupled to the first and second connection electrodes 356 and 346 of the liquid lens 300, and thus may be connected to the first electrode 355 or the second electrode 345. The upper terminal unit of the connection board 380 may be integrated with first and second connection electrodes 380-1 and 380-2 so as to be connected to the first electrode 355 or the second electrode 345 of the liquid lens 300. The lower terminal unit of the connection board 380 may be electrically connected to the terminal plate 390, which will be described later.

The connection board 380 may include a horizontal plate 381, which is coupled to the first electrode 355 or the second electrode 345, and a vertical plate 382, which is bent from the horizontal plate 381 and is coupled to the terminal plate 390. The above-described upper terminal unit may be included in the horizontal plate 381, and the lower terminal unit may be included in the vertical plate 382.

For example, the horizontal plate 381 may have a rectangular band shape so as to be in close contact with the first electrode 355 or the second electrode 345 of the liquid lens 300. The horizontal plate 381 may have a predetermined length such that the outer side thereof is exposed to the outside of the holder.

The vertical plate 382 may be formed so as to extend from the outer side of the horizontal plate 381 and to be bent downwards. For example, the vertical plate 382 may have a band shape having a length longer than the length of the horizontal plate 381.

The lower region of the vertical plate 382 may cover the outer side of the terminal plate 390 so as to realize electrical bonding. Thus, the vertical plate 382 may have a vertical length so that the vertical plate 382 may cover at least the upper region of the terminal plate 390. For example, the vertical plate 382 may be electrically bonded to the terminal plate 390, so long as the length of the vertical plate 382 is set such that the end of the vertical plate 382 is located between the upper region of the terminal plate 390 and the lower region thereof. That is, the electrical bonding between the connection board 380 and the terminal plate 390 may not be greatly affected by a manufacturing tolerance of the connection board 380.

The vertical plate 382 may have a width smaller than the width of the terminal plate 390. Since the lower end portion of the vertical plate 382 is electrically bonded to the terminal plate 390, the connection board 380 and the terminal plate 390 may be provided separately from each other, thereby preventing the connection board 380 from being formed to be larger than necessary.

The connection board 380 described above may have a concave portion 383, which is recessed in the bent region between the horizontal plate 381 and the vertical plate 382. Due to the concave portion 383 formed at the connection board 380, the vertical plate 382 may be easily bent in the vertical direction from the horizontal plate 381, and the bent region between the horizontal plate 381 and the vertical plate 382 may be prevented from being damaged by stress.

For example, the concave portion 383 may have a semicircular shape in which the side surface of the connection portion between the horizontal plate 381 and the vertical plate 382 is recessed in order to disperse the stress. The concave portion 383 may be formed at each of opposite sides of the bent region of the connection board 380 in order to further facilitate the bending and to evenly disperse the stress.

The concave portion 383 may be formed in any of various shapes, such as a U shape, a V shape, and a 90-degree rotated U shape, without being limited to the aforementioned shape, and may be disposed at only one side of the bent region.

The terminal plate 390 may include a conductive metal material and may be coupled to the base 700. For example, the terminal plate 390 may a height extending from the terminal 810 of the sensor board 800 to the upper portion of the base 700 and may be coupled to the side surface of the base 700. Thus, the lower region of the terminal plate 390 may be easily bonded to the terminal 810 of the sensor board 800 using a solder ball 820 or the like regardless of the connection board 380.

As such, a portion of the terminal plate 390 (a portion from the upper region to the lower region) may be coupled to the lower portion of the connection board 380, and another portion of the terminal plate 390 (the lower region) may be coupled to the terminal 810 of the sensor board 800.

Here, at least one of the two following methods may be used for the electrical connection between the terminal plate 390 and the connection board 380 described above.

For example, as indicated by "A" in FIG. 4, electrical bonding may be applied to the region at which the outer side of the terminal plate 390 and the inner side of the vertical plate 382 of the connection board 380 contact each other. As indicated by "B" in FIG. 4, electrical bonding may be applied to the outer side of the region at which the end portion of the terminal plate 390 and the end portion of the vertical plate 382 contact each other.

Here, the bonding may be realized using any of various electrical connection methods such as soldering and a solder ball.

As described above, in the camera module including the liquid lens and the optical device according to the embodiments, since the connection board and the terminal plate are electrically coupled to each other, the electrical connection between the liquid lens and the sensor board may be more conveniently realized without being influenced by a manufacturing tolerance of the connection board or the coupling gap between the holder and the base.

FIGS. 5 to 7 are front views showing the coupled state of the connection board and the terminal plate according to a second example, a third example, and a fourth example of the camera module, and FIG. 8 is a cross-sectional view showing an example of the liquid lens in the camera module shown in FIG. 1.

The connection boards 380, 380a, 380b and 380c may be formed in any of various forms, as shown in the second to fourth examples.

The connection board 380a shown in FIG. 5 may include a V recess 382a-1 recessed in the end portion of the vertical plate 382a. The V recess 382a-1 may lead to an increase in the length of the side defining the end portion of the vertical plate 382a, thus expanding the region that is bonded to the terminal plate 390. The bonding force may be increased and the bonding process may be realized easily and conveniently due to the expansion of the bonding region.

The connection board 380b shown in FIG. 6 may include a semicircular recess 382b-1 recessed in the end portion of the vertical plate 382b. The semicircular recess 382b-1 may lead to an increase in the length of the side defining the end portion of the vertical plate 382b, thus expanding the region that is bonded to the terminal plate 390. The bonding force may be increased and the bonding process may be realized easily and conveniently due to the expansion of the bonding region. The semicircular recess may be more effective in terms of dispersion of stress.

The connection board 380c shown in FIG. 7 may include a through-hole 382c-1 formed in the end portion of the vertical plate 382c. The though-hole 382c-1 may be formed in any of various shapes such as a circle, an oval, a quadrangle, and a rectangle. The through-hole 382c-1 may lead to an increase in the length of the region around the through-hole 382c-1 in the end portion of the vertical plate 382c, thus expanding the bonding region, with the result that the bonding force may be increased and the bonding process may be realized easily and conveniently.

FIGS. 8 and 9 are views showing examples of the connection board including a lifting prevention portion.

As shown in FIGS. 8 and 9, the connection board 380-1 and 380-2 may include a horizontal plate 381-1 and 381-2, which is coupled to the first electrode 355 (refer to FIG. 2) or the second electrode 345 (refer to FIG. 2) of the liquid lens 300, and a vertical plate 382-1 and 382-2, Which is bent from the horizontal plate 381-1 and 381-2. Here, the connection board 380-1 and 380-2 may be coupled to the liquid lens 300 to form the first electrode 355 and the second electrode 345.

FIG. 8 shows the connection board 380-1, which is coupled to the first electrode (the upper electrode) of the liquid lens 300 or forms the first electrode, and FIG. 9 shows the connection board 380-2, which is coupled to the second electrode (the lower electrode) of the liquid lens 300 or forms the second electrode.

The connection board 380-1 and 380-2 may be a flexible printed circuit board (FPCB) or a metal plate. For example, the connection board 380-1 shown in FIG. 8 may be a flexible printed circuit board (FPCB), and the connection board 380-2 shown in FIG. 9 may be a metal plate.

The above-described connection board 380-1 and 380-2 may be connected to the electrode of the liquid lens 300, and may be bent downwards so as to be coupled to the terminal plate 390 (refer to FIGS. 4 to 7) and to be electrically bonded to the terminal 810 (refer to FIGS. 4 to 7).

However, when a general connection board is bent, it may lift upwards or downwards from an electrode due to the stiffness thereof. This lifting phenomenon may cause an unstable connection to the electrode, resulting in a defect.

Therefore, the embodiment may include a lifting prevention portion for preventing the connection board 380-1 and 380-2, which is connected to the electrode, from lifting upwards or downwards. The lifting prevention portion may include a reinforcing pad 385-1, 385-2, 384-1 and 384-2, which is coupled to at least one of the horizontal plate 381-1 and 381-2 or the vertical plate 382-1 and 382-2 of the connection board 380-1 and 380-2, rather than to the bent region of the connection board 380-1 and 380-2.

In the embodiments shown in FIGS. 8 and 9, the reinforcing pad 385-1, 385-2, 384-1 and 384-2 is coupled to each of the horizontal plate 381-1 and 381-2 and the vertical plate 382-1 and 382-2 of the connection board 380-1 and 380-2. However, the reinforcing pad 385-1, 385-2, 384-1 and 384-2 may be selectively coupled to the horizontal plate 381-1 and 381-2 or the vertical plate 382-1 and 382-2 of the connection board 380-1 and 380-2.

The reinforcing pad 385-1, 385-2, 384-1 and 384-2 may be coupled to the lower side of the horizontal plate 381-1 and 381-2 or to the inner side of the vertical plate 382-1 and 382-2 of the connection board 380-1 and 380-2, rather than to the bent region of the connection board 380-1 and 380-2. The region of the connection board 380-1 and 380-2, to which the reinforcing pad 385-1, 385-2, 384-1 and 384-2 is coupled, has stiffness greater than the stiffness of the bent region of the connection board 380-1 and 380-2, and thus is not easily deformed, thereby preventing the lifting of the connection board 380-1 and 380-2 that is connected to the electrode and is formed so as to be bent.

For example, the reinforcing pad 385-1, 385-2, 384-1 and 384-2 may have a shape and an area corresponding to the width of the horizontal plate 381-1 and 381-2 or the width of the vertical plate 382-1 and 382-2. The reinforcing pad 385-1, 385-2, 384-1 and 384-2 may have a thickness of 0.05 to 0.1 cm.

In addition, like the embodiments described above, the connection board may further include a concave portion 383-1 and 383-2 recessed in the bent region between the horizontal plate 381-1 and 381-2 and the vertical plate 382-1 and 382-2. The concave portion 383-1 and 383-2 may decrease the stiffness of the bent region, thereby facilitating the process of bending the connection board and preventing lifting of the connection board connected to the electrode. The effects may be further enhanced in the case in which the connection board is a metal plate.

As described above, in the camera module including the liquid lens and the optical device according to the embodiments, since the connection board and the terminal plate are electrically coupled to each other, the electrical connection between the liquid lens and the sensor board may be more conveniently realized without being influenced by a manufacturing tolerance of the connection board or the coupling gap between the holder and the base.

In addition, the concave portion may cause the connection board to be more easily bent and conveniently bonded to the terminal plate and to be prevented from being damaged by stress. In addition, the lifting prevention portion provided at the connection board may prevent the connection board, connected to the electrode, from lifting upwards or downwards.

The camera module including the above-described liquid lens may be mounted in various digital devices, such as a digital camera, a smartphone, a laptop computer, and a tablet PC. In particular, the camera module may be mounted in mobile devices to realize an ultra-thin high-performance zoom lens.

For example, a display device, in which the camera module, including the liquid lens, the first and second lens units, the filter, and the light-receiving element, converts an image incident from the outside into an electrical signal, may include a display module including a plurality of pixels, the colors of which are changed by the electrical signal. The display module and the camera module may be controlled by a control unit.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

INDUSTRIAL APPLICABILITY

A camera module including a liquid lens according to the embodiment may be used in mobile devices.

The invention claimed is:
1. A camera module, comprising:
a liquid lens comprising an electrode;
a holder accommodating the liquid lens therein;
a base disposed under the holder;
a sensor board disposed under the base, the sensor board comprising an image sensor;
a connection board connected to at least a portion of the electrode of the liquid lens, the connection board including:
a horizontal plate disposed at a position corresponding to the electrode;
a vertical plate disposed at a position corresponding to a side surface of the liquid lens; and
a connection plate disposed between the horizontal plate and the vertical plate; and
a vertically extending terminal plate disposed at the base such that a vertical surface of the terminal plate overlaps with a vertical surface of the vertical plate, the terminal plate being electrically connected to the sensor board and the vertical plate of the connection board.

2. The camera module according to claim 1, wherein the liquid lens comprises:
a first plate comprising a cavity formed therein to accommodate a first liquid, which is conductive, and a second liquid, which is non-conductive, therein;
a second plate disposed on the first plate; and
a third plate disposed under the first plate, and
wherein the electrode comprises:
a first electrode disposed on the first plate; and
a second electrode disposed under the first plate.

3. The camera module according to claim 2, wherein the connection board is disposed so as to be electrically connected to the first electrode or the second electrode of the liquid lens, and
wherein one side of the terminal plate is coupled to a lower portion of the vertical plate, and an opposite side of the terminal plate is coupled to the sensor board.

4. The camera module according to claim 3, wherein the horizontal plate is disposed at a position corresponding to the first electrode or the second electrode.

5. The camera module according to claim 1, wherein the connection plate comprises a bent region and connects the horizontal plate and the vertical plate to each other, and
wherein the connection board further comprises a concave portion recessed in the bent region.

6. The camera module according to claim 1, wherein a width of the connection board gradually decreases from the horizontal plate to the vertical plate.

7. The camera module according to claim 5, wherein the concave portion is disposed at each of opposite sides of the bent region.

8. The camera module according to claim 1, wherein the vertical plate has a width smaller than a width of the terminal plate, and has a vertical length to cover at least a portion of an upper region of the terminal plate.

9. The camera module of claim 1, comprising:
a reinforcing pad disposed on at least one of the horizontal plate or the vertical plate, the reinforcing pad having stiffness greater than stiffness of the connection plate.

10. The camera module according to claim 9, wherein the reinforcing pad is coupled to a lower portion of the horizontal plate or to an inner side of the vertical plate.

11. The camera module according to claim 3, comprising a solder ball bonding a lower region of the opposite side of the terminal plate to the sensor board.

12. The camera module according to claim 3, wherein the terminal plate has a height extending from a terminal of the sensor board to an upper portion of the base.

13. The camera module according to claim 12, wherein the terminal plate is coupled to a side surface of the base.

14. The camera module according to claim 1, wherein the vertical plate has a length longer than a length of the horizontal plate.

15. The camera module according to claim 1, wherein the connection board includes a V recess recessed inward at an end portion of the vertical plate.

16. The camera module according to claim 1, wherein the connection board includes a semicircular recess recessed inward at an end portion of the vertical plate.

17. The camera module according to claim 1, wherein the connection board includes a through-hole formed at an end portion of the vertical plate.

18. The camera module according to claim 5, wherein the concave portion has a semicircular shape in which a side surface of the connection portion between the horizontal plate and the vertical plate is recessed.

19. The camera module according to claim 9, wherein the reinforcing pad is coupled to a lower portion of the horizontal plate, rather than to a bent region of the connection board.

20. The camera module according to claim 9, wherein the reinforcing pad is coupled to an inner side of the vertical plate of the connection board, rather than to a bent region of the connection board.

* * * * *